United States Patent

[11] 3,573,652

[72] Inventor Thomas H. Charters
 6855 S.W. Raleighwood Way, Portland, Oreg. 97225
[21] Appl. No. 805,339
[22] Filed Mar. 7, 1969
[45] Patented Apr. 6, 1971

[54] RANDOM INTERVAL TIMER
 13 Claims, 5 Drawing Figs.
[52] U.S. Cl............................................. 331/78,
 307/232, 307/273, 307/283, 307/288, 331/47,
 331/111, 331/113, 331/117, 331/173
[51] Int. Cl............................................. H03b 29/00
[50] Field of Search........................................ 331/47, 78,
 1 173; 328/63

[56] References Cited
UNITED STATES PATENTS
| | | | |
|---|---|---|---|
| 2,671,896 | 3/1954 | DeRosa | 343/17.1 |
| 3,427,478 | 2/1969 | Etter | 331/78X |
| 3,445,591 | 5/1969 | Koehler et al. | 331/78X |

OTHER REFERENCES
White, Journal of Scientific Instruments, Vol. 41, Jun. 1964, pp. 361— 364. (331-78)
White, The Review of Scientific Instruments, Vol. 30, Sept. 1959, pp. 825— 829. (331-78)

*Primary Examiner*—John Kominski
*Assistant Examiner*—Siegfried H. Grimm
*Attorney*—Buckhorn, Blore, Klarquist and Sparkman ABSTRACT: Apparatus according to the present invention produces an output at random time intervals following a Poisson distribution. A first pulse generator means, comprising first and second time delay circuits, produces a first periodic pulse having a period on the order of minutes. A second pulse generator means provides a second repetitive pulse having a predetermined average period which is much less than the period of the first pulse, with the exact time of occurrence of the second pulse being modulated by a random noise signal. A coincidence detector indicates time coincidence between the first and second pulses and causes an audible output to be produced. The duty factor of the second pulse predetermines the chance for coincidence.

Patented April 6, 1971

THOMAS H. CHARTERS
INVENTOR

BY
BUCKHORN, BLORE, KLARQUIST & SPARKMAN
ATTORNEYS

Patented April 6, 1971

THOMAS H. CHARTERS
INVENTOR

BY
BUCKHORN, BLORE, KLARQUIST & SPARKMAN
ATTORNEYS

RANDOM INTERVAL TIMER

BACKGROUND OF THE INVENTION

Statistical sampling is a method for gathering information from a large body of data, and producing information which is truly representative of the data. The accuracy of this kind of sampling technique depends in each case upon the randomness which characterizes the time intervals between samples. Heretofore, a person taking random samples might record a sample, e.g. an activity at a given time, and then consult a table of random time interval numbers for establishing the intervening period before the next sample is taken.

Various semiautomatic timer devices are available which attempt to establish random time intervals. However, rather than being truly automatic, some of these devices depend upon human intervention, such as, for example, the setting of the device at the start of each time interval. Moreover, the number of samples taken over a given period of time, that is, the average interval length, may not be statistically controllable.

SUMMARY OF THE INVENTION

According to the present invention, a first means generates a first repetitive pulse having a period between pulse occurrences on the order of minutes or greater. A second means for generating a second repetitive pulse, having a predetermined average period which is much less than the period of the first pulse, generates such second pulse having a predetermined duration as compared with the average period between second pulses. The chance of time coincidence with the first pulse is thereby established. Means modulate the time of occurrence of one of the pulses with random noise, and time coincidence between the first and second pulses is detected for producing an audio tone or the like. As a consequence of the average periodicity of the second pulse and the predetermined duration thereof as compared with the average period between second pulses, a controlled Poisson distribution of outputs is achieved.

According to a preferred embodiment of the present invention, the means for producing the first pulse comprises first and second time delay circuits wherein the first time delay circuit periodically produces an output with a relatively long interval between outputs. The second time delay circuit is responsive to the output of the first and produces the said first pulse in a relatively short period of time after the output of the first time delay circuit. The first pulse, as applied to a coincidence detector or the like, is then less subject to being influenced by the occurrence of the aforementioned second pulse.

In a preferred embodiment of the present invention, the time of occurrence of the second pulse is modulated with a random noise signal. In accordance with a further embodiment of the present invention, the aforementioned second means for generating a second pulse is empowered only for a period of time when the aforementioned first time delay circuit produces an output. The power consumption of the apparatus, normally quite low, is then even lower.

It is accordingly an object of the present invention to provide an improved random interval timer which automatically provides output indications at random time intervals.

It is a further object of the present invention to provide an improved random interval timer characterized by a predetermined statistical distribution of interval times, averaging to a controlled number of samples.

It is another object of the present invention to provide an improved random interval timer producing time interval outputs substantially following a Poisson distribution.

It is a further object of the present invention to provide an improved random interval timer which is portable in nature and which employs a small power supply battery with a very small drain being made thereupon.

It is a further object of the present invention to provide an improved random interval timer which is economical in construction, portable in nature, and reliable in operation.

The subject matter which I regard as my invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements.

DRAWINGS

DETAILED DESCRIPTION

Figure 1:
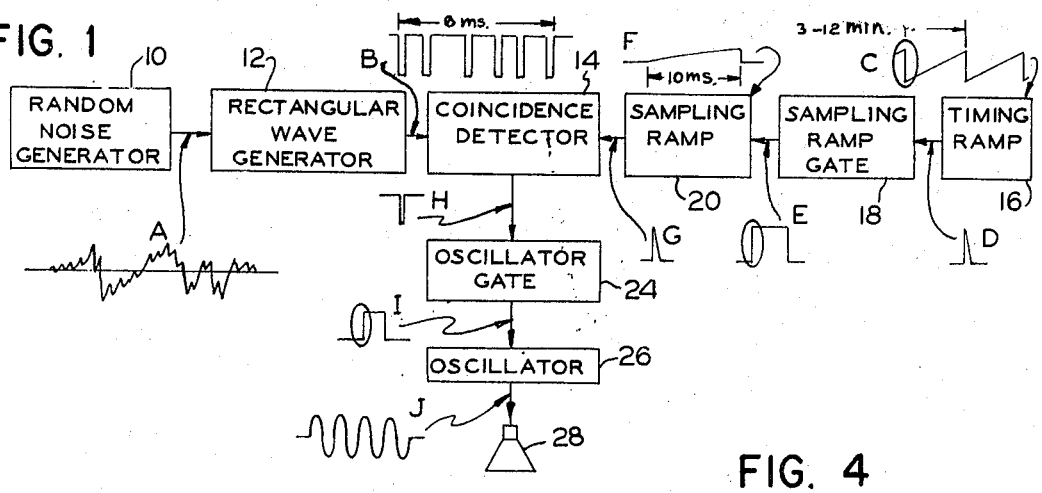
FIG. 1 is a block diagram of apparatus according to the present invention.

Referring to FIG. 1, illustrating a circuit according to the present invention in block diagram form, a random noise generator 10 produces a noise signal indicated at A for time modulating the output of rectangular wave generator 12. Rectangular generator 12 has a normal period in the absence of the noise input A whereby it produces a train of rectangular waves having a given period between occurrences thereof, if it were not affected by the A input. However, the A noise input is effective for either advancing or retarding the occurrence of each pulse output. As a result, an output signal illustrated at B is produced, comprising negative-going pulses occurring at substantially random times, but wherein the average period between occurrences thereof is predetermined. This waveform B constitutes one input of coincidence detector 14. The waveform outputs illustrated next to the various blocks in FIG. 1 are duplicated in timed relation in the waveform chart of FIG. 3.

The second input of coincidence detector 14 is provided from a pulse generator means comprising timing ramp circuit 16, sampling ramp gate 18, and sampling ramp circuit 20. Timing ramp circuit 16 is a ramp generator internally providing a waveform C. Circuit 16 produces a pulse output periodically with a relatively long time delay period between recurrences, typically on the order of minutes or longer. The output of the timing ramp circuit 16 is indicated at D and comprises a positive-going output pulse produced at the conclusion of each of the ramps indicated in waveform C, for example as encircled in FIG. 1. The occurrence of waveform D operates sampling ramp gate 18 to produce a gate output E which starts sampling ramp circuit 20. Sampling ramp circuit 20 is also a time delay circuit for producing output pulses at a time which is delayed from the occurrence of pulse D and gate E. Sampling ramp circuit 20 comprises a ramp generator for providing a ramp waveform F, and waveform G at the conclusion of such ramp. Whereas the duration of a ramp in waveform C is on the order of minutes or longer, typically being 3 to 12 minutes, the duration of ramp F is much shorter, being on the order of 10 milliseconds in the specific example. Because of the disparity in the duration of these waveforms, the conclusion of waveform C (e.g. as within the circled portion in FIG. 1) appears as a rectangular wave in FIG. 3, when displayed on the same time scale with ramp F.

Figure 3:
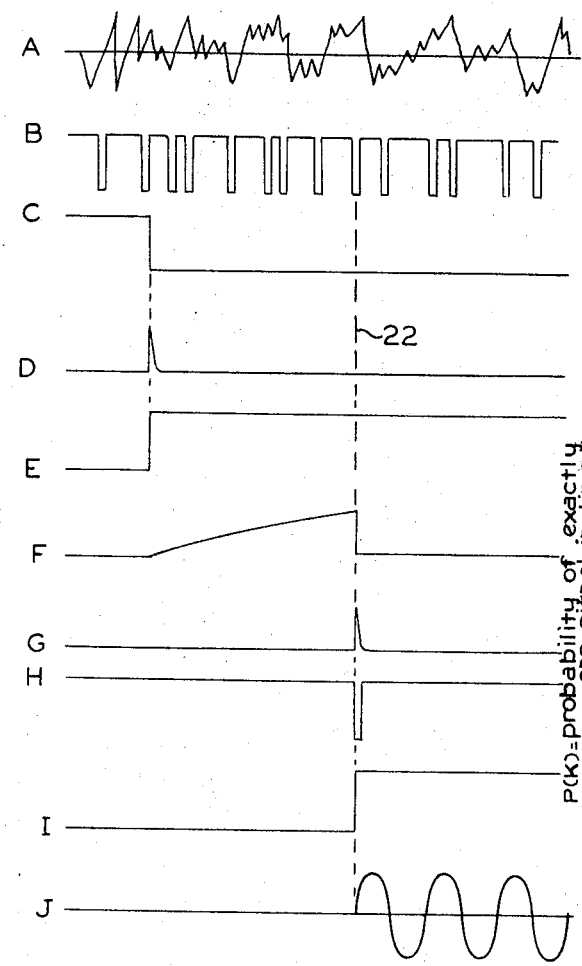
FIG. 3 is a chart of waveforms illustrating operation of the apparatus of FIGS. 1 and 2.

When coincidence detector 14 detects the time coincidence of a negative-going pulse in waveform B and a pulse G, as indicated by dashed lines 22 in FIG. 3, the coincidence detector provides an output pulse H for operating oscillator gate 24 which in turn empowers oscillator 26 for driving speaker 28 with a waveform J, the latter having a frequency within the audio range. Gate waveform I suitably has a duration of approximately 3 seconds, and only the part thereof circled in FIG. 1 is illustrated in FIG. 3. When an audio tone occurs, the person employing the present device records a sample or the like. Of course, automatic sampling equipment may be energized in place of generation of an audio tone.

Considering the overall operation of the FIG. 1 circuit, timing ramp circuit 16, sampling ramp gate 18, and sampling ramp circuit 20 may be considered as a first means for providing a pulse output which is periodic, wherein the period between repetitions of waveform G is quite long, on the order of minutes or longer. Timing elements selected for timing ramp circuit 16 and sampling ramp circuit 20 render this period predictable and selectable. On the other hand, the pulse output B from rectangular generator 12 has a much shorter period of approximately between 1 and 2 milliseconds, with this period varying randomly according to noise input A. Therefore, not every occurrence of pulse waveform G will coincide with a pulse waveform B to provide a coincidence.

The chance of coincidence occurring is determined by selecting the duration of the negative-going pulse outputs of rectangular wave generator 12. For example, if the duration of each negative-going pulse of waveform B were half of the period between pulse occurrences in waveform B, then there would be a 50 percent chance of a coincidence occurring. In a preferred circuit according to the present invention, the duration of each negative-going pulse B is between 5 and 15 percent of the period between pulse occurrences, and preferably one-tenth the period. Therefore, there is about a 10 percent chance that a given waveform output G will coincide with the waveform output B. Then, on the average, one coincidence will take place for every 10 occurrences of waveform G, but the time of coincidence cannot be predicted. The sampling principle employed is analogous to flipping a coin with one head and nine tails. On the average, one out of ten tosses will produce a head. This type of random process is described by a binomial probability law. However, the present circuit, employing a 10 percent duty factor rectangular wave B and thereby establishing a probability of coincidence of 0.1 at each sampling time, causes the binomial probability law to reduce approximately to the Poisson probability law.

Figure 5:
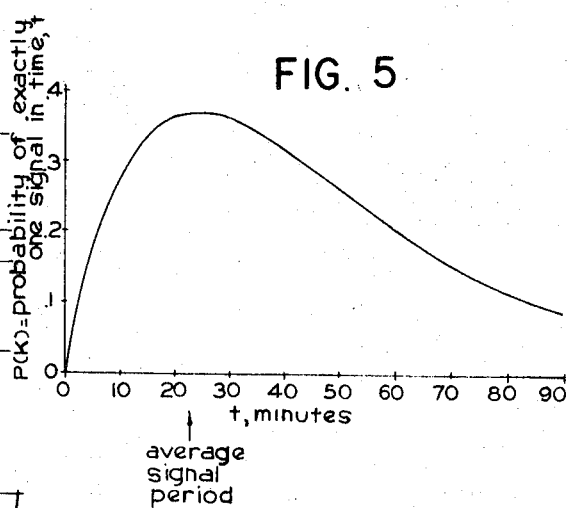
FIG. 5 is a graph illustrating a statistical distribution of interval times provided by the timer according to the present invention.

The curve in FIG. 5 illustrates both a theoretical Poisson distribution as well as approximately the measured distribution of outputs from the FIG. 1 circuit. The graph plots the probability of one and only one output occurring in a time, $t$. The average signal period is indicated by the curve maximum. The intervals of outputs may actually range from 3 minutes to as much as 8 hours, but the average interval length over many intervals (e.g. more than 20 intervals) is predictable and programmable. In the present circuit, the average interval length is predetermined by presetting the duty factor of waveform B, or in other words, the duration of the negative-going pulses compared with the time between occurrences thereof, and also by presetting the time between occurrences of timing ramp circuit 16. This feature enables one to know in advance how many audible outputs will occur at speaker 28 over an extended period of time without knowing when the audible outputs will occur. Thus, the mean rate of occurrence and the range of time spread therebetween can be present so that a desired number, but not an excessive number, of sampling times are predetermined. When the number of sampling times can be predetermined, the person recording samples will not be interrupted from his regular between-sample activity by an excessive amount.

The average periodicity of waveform B and the predetermined duty factor thereof contribute to providing a Poisson distribution, and control thereof. The Poisson distribution is desirable or required for many types of statistical samplings. The present circuit is automatic and continues to produce the output having a Poisson distribution without resetting or other human intervention, thereby rendering the output distribution substantially foolproof.

One important feature of the FIG. 1 circuit relates to the employment of a long duration ramp signal or timing period as indicated register C, which triggers a relatively short duration ramp or timing signal as indicated at F. The apparatus according to the present invention is quite portable, and in particular instance has provided through dimensions 150, the emitter-base junction of transistor 156, diode 154, resistor 146, and transistor 140 to ground, turning transistor 156 1⅛ inches×2⅝ inches×5¾ inches, weighing 8 ounces. The device was battery operated from a small transistor radio-type battery having a life of several hundred hours under continuous operating conditions. As will be observed, the slope of the timing ramp C is quite small when viewed on the same time scale which illustrates the occurrence of the other signals. (FIG. 3). It has been found that direct application of the output of a long duration timing ramp circuit to a coincidence detector in a small apparatus frequently causes a coincidence to be indicated between the timing ramp output and one of the negative-going pulses of waveform B, whether or not such coincidence should occur. The coupling in the small portable apparatus is relatively close, especially when the same battery is employed for a power source leading to triggering of the end of a ramp in circuit 16 by one of the negative-going pulses of waveform B. According to the present circuit, however, the output of timing ramp circuit 16 is applied via sampling ramp circuit 20 and via sampling ramp gate 18. A waveform F is produced having a much greater slope, and the end of which has substantially no possibility of being triggered by the occurrence of one of the negative-going pulses of waveform B. Thus, a true statistical chance is present for the coincidence of the output of sampling ramp circuit 20 and that of rectangular wave generator 12. Even if the conclusion of a waveform C ramp is then triggered by one of the negative-going pulses of waveform B, there should still be a correct statistical chance of waveform G coinciding with one of the negative-going pulses of waveform B. In one circuit, as hereinafter more fully described, operation of random noise generator 10 and rectangular wave generator 12 is actually started at the conclusion of a waveform C ramp, thereby materially reducing battery drain and prolonging the life of the battery to thousands of hours.

Figure 2:
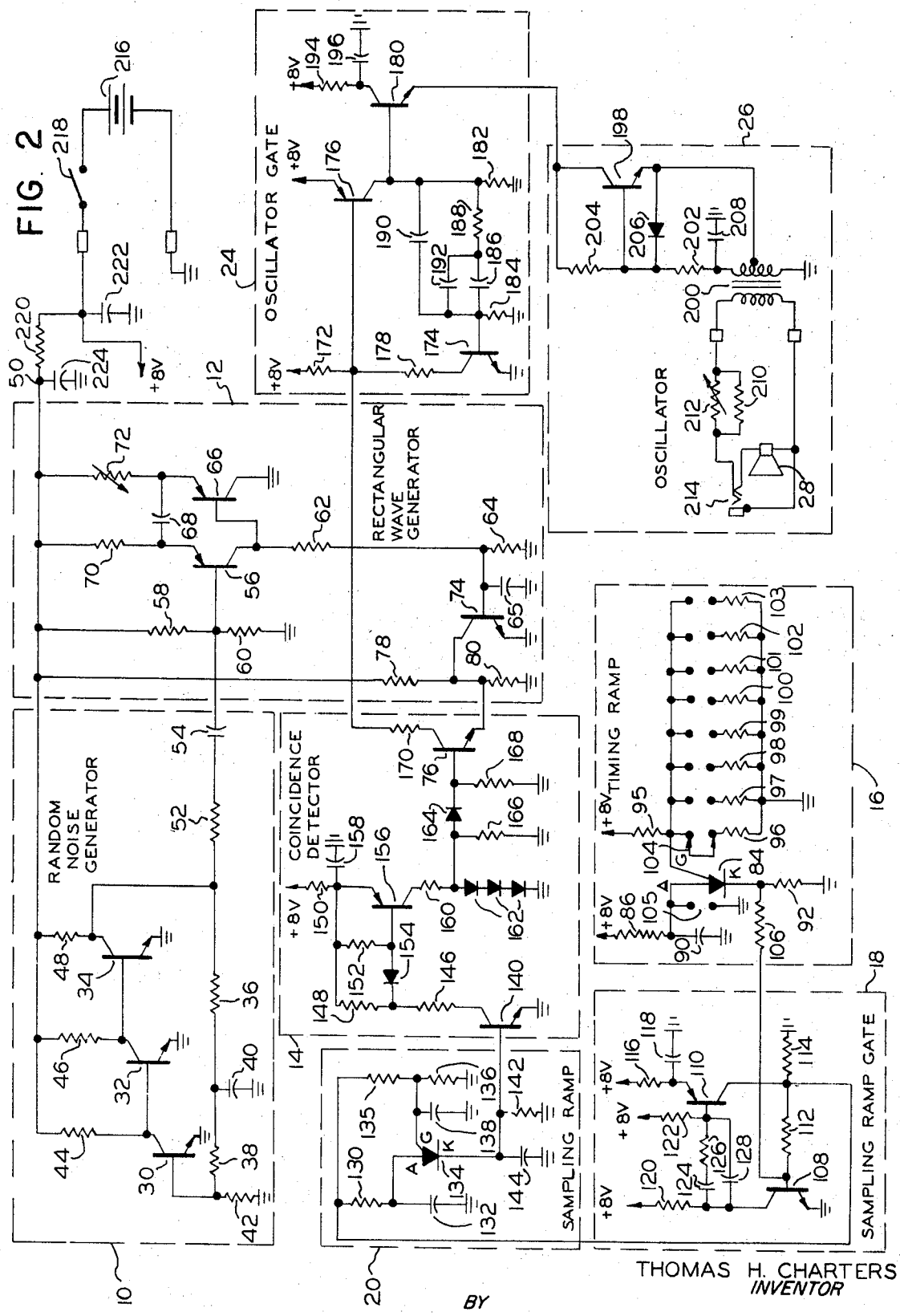
FIG. 2 is a schematic diagram further illustrating the FIG. 1 apparatus.

A specific example of the circuit according to the present invention is illustrated in FIG. 2 wherein like elements are referred to with like reference numerals. Random noise generator 10 comprises a transistor 30, the shot noise and the like from which is amplified greatly by transistors 32 and 34 in a direct-coupled cascaded circuit. A DC feedback path for this high gain amplifier is provided via resistors 36 and 38 connected in series from the collector of transistor 34 to the base of transistor 30. The center tap between resistors 36 and 38 is returned to ground employing a relatively large capacitor 40. A resistor 42 returns the base of transistor 30 to ground while load resistors 44, 46, and 48 couple the respective transistor collectors to voltage supply terminal 50. The output of transistor 34 is coupled through resistor 52 and capacitor 54 in series to the base of transistor 56, the latter forming one component of rectangular wave generator 12.

The base of transistor 56 is also connected to the midpoint of a biasing voltage divider comprising resistors 58 and 60 disposed between ground and positive voltage terminal 50, while a voltage divider comprising resistors 62 and 64 in series returns the collector of transistor 56 to ground. The collector of transistor 56 is also directly connected to the base of transistor 66, the latter having its collector grounded and its emitter coupled to the emitter of transistor 56 via capacitor 68. Resistor 70 connects the emitter of transistor 56 to voltage supply terminal 50 and a variable resistor 72 similarly connects the emitter of transistor 66 to voltage supply terminal 50.

The rectangular wave generator 12 as thus far described comprises a free-running multivibrator wherein the transistors 56 and 66 are alternately conducting. Resistor 70 is typically much larger than resistor 72, with resistor 70 suitably having a value of approximately 150 K while resistor 72 may have an average value of 20 K. Assuming transistor 56 has just become conducting, a positive-going signal will be applied to the base of transistor 66 via the direct connection, and a negative-going signal will be applied to the emitter of transistor 66 via capacitor 68. Transistor 66 will therefore shut off. Current through resistor 72 will now charge capacitor 68 whereby the emitter of transistor 66 eventually becomes positive enough so that transistor 66 begins to conduct. The resulting negative-going voltage excursion on the emitter of transistor 66 is coupled to the emitter of transistor 56 through capacitor 68 tending to turn transistor 56 off. As transistor 56 conducts less current, the collector voltage thereof drops whereby transistor 66 conducts more strongly, and so on. Now, resistor 70 charges capacitor 68 until the emitter of transistor 56 becomes positive enough to turn on transistor 56. Since resistor 70 is larger than resistor 72, transistor 66 conducts the majority of the time. Resistor 72 is adjusted so that transistor 56 conducts about 10 percent of the time, for an appropriate value to provide the aforementioned Poisson distribution. Of course, other values may also be selected for adjusting the duration of pulses in waveform B.

The circuit comprising transistor 56 and 66 is free-running, and normally provides a positive-going, approximately 10 percent duty factor pulse, which is substantially periodic, at the base of transistor 74. However, noise signals coupled via resistor 52 and capacitor 54 retard or advance the occurrence of such outputs as hereinbefore mentioned. Thus transistor 56 may become triggered at its base at a time before it normally would, or the noise signal may be of an opposite polarity, tending to delay triggering. The pulse outputs are inverted in transistor 74 and applied at the emitter of transistor 76 in coincidence detector 14. Thus, negative-going pulses are applied at the emitter of transistor 76, such emitter being biased by means of a voltage divider comprising resistor 78 and 80 disposed between voltage supply terminal 50 and ground.

Timing ramp circuit 16 employs a four-layer semiconductor device known as "Programmable Unijunction Transistor," manufactured by the General Electric Company. This element is indicated by reference numeral 84, and includes an "anode" terminal A, a "cathode" terminal K, and a "gate" terminal G. In the specific circuit, the Programmable Unijunction Transistor" was a General Electric type D13T2. The transistor 84 operates such that a fairly high resistance exists between terminals A and K thereof until such time as the voltage applied at terminal A exceeds the voltage applied at terminal G. Further referring to the diagram, a time constant circuit comprising resistor 86 and capacitor 90 is disposed in that order between a positive voltage point and ground. The junction between resistor 86 and capacitor 90 is connected to Terminal A of transistor 84, while terminal K of transistor 84 is returned to ground through resistor 92. Terminal G of transistor 84 is connected to the midpoint of a voltage divider comprising resistor 95, and one of the selected resistors 96 through 103 disposed in that order between a positive voltage point and ground. A jumper 104, suitably accessible in the instrument, is employed for selecting one of the resistors 96 through 103. The various resistors 96 through 103 are graded resistances, and provide a selectably lower voltage at terminal G of transistor 84 as the jumper 104 is moved to the right. Let us assume capacitor 90 starts to charge through resistor 86. One of the ramp waveforms indicated at C in FIG. 1 will be produced as the capacitor charges, and when it reaches the voltage of terminal G as selected by the voltage divider 95, 96-—103, the transistor device 84 exhibits a low resistance between terminals A and K whereby capacitor 90 is immediately discharged. The circuit comprising resistor 86 and capacitor 90 is arranged to have a selectable long-time constant on the order of several minutes or longer as hereinbefore mentioned, and when the voltage of terminal G is reached by capacitor 90, then a current increase will take place in resistor 92 resulting in a positive-going pulse as indicated at D in FIGS. 1 and 3 which is applied via resistor 106 to the base of transistor 108 in sampling ramp gate 18. In order to achieve an even longer time constant, an additional capacitor (not shown) may be inserted at terminals 105 across capacitor 90.

The sampling ramp gate is a monostable circuit comprising transistors 108 and 110 which are both either off or on at the same time. These transistors are normally in a nonconducting condition. The base of transistor 108, in addition to being connected to resistor 106, is also connected to a voltage divider comprising resistors 112 and 114 serially disposed between the base of transistor 108 and ground. The midpoint of this voltage divider is connected to the collector of transistor 110. The emitter of transistor 110 is coupled to a positive source through resistor 116 and the capacitor 118 is disposed between the emitter and ground. The collector of transistor 108 and the base of transistor 110 are returned to a positive source employing resistors 120 and 122, respectively. A feedback coupling circuit comprises a capacitor 124 in series with a resistor 126, the series connection being shunted by a capacitor 128. Such parallel connection is disposed between the collector of transistor 108 and the base of transistor 110.

When the positive-going pulse is applied at the base of transistor 108 at the conclusion of a ramp in waveform C, transistor 108 is turned on, and a negative-going excursion at its collector terminal is coupled to the base of transistor 110 by way of elements 124, 126, and 128. Transistor 110 is also thereby turned on. When capacitors 124 and 128 charge to a given value, transistor 110 will turn off, and its collector voltage will drop, and this drop, coupled to the base of transistor 108 through resistor 112, turns transistor 108 off. During the time that transistors 108 and 110 are on, a positive pulse E (see FIGS. 1 and 3) is produced. The period thereof is suitably about 1 second.

The pulse E is applied to a time constant circuit comprising resistor 130 in series with capacitor 132 in sampling ramp circuit 20. The elements 130 and 132 are disposed between the collector of transistor 110 and ground, with the junction therebetween being directly coupled to the A terminal of "Programmable Unijunction Transistor" 134 which is also provided with terminals G and K, these terminal designations having the same meanings as hereinbefore described in connection with transistor 84. Transistor 134 in a specific circuit was a General Electric type D13T1. The positive pulse from the collector of transistor 110 is also applied to a voltage divider comprising resistors 135 and 136 interposed in that order between the collector of transistor 110 and ground. The junction between resistors 135 and 136 is direct coupled to terminal G of transistor 134, while a capacitor 138, shunted to ground, stabilizes the voltage at this point. Terminal K at transistor 134 is connected to the base of transistor 140, in coincidence detector 14, while the parallel combination of resistor 142 and capacitor 144 is disposed between terminal K and ground. When the output pulse E is applied to the time constant circuit comprising resistor 130 and capacitor 132, the capacitor 132 charges up as indicated by waveform F in FIGS. 1 and 3. When the charge reaches a predetermined value set at terminal G by the voltage at the midpoint of the voltage divider 135–136, a low resistance path is provided between terminals A and K of transistor 134, and capacitor 132 is discharged. Also at this time, a positive pulse is provided at the base of transistor 140, as an input to the coincidence detector 14.

This positive pulse is waveform G in FIGS. 1 and 3. The time constant of the circuit comprising resistor 130 and capacitor 132 is much shorter than that of circuit 86—90, whereby waveform G is produced a few milliseconds, e.g. 10 milliseconds, after the start of waveform E. In coincidence detector 14, the emitter of transistor 140 is grounded, while the collector is connected to a positive voltage by way of resistors 146, 148 and 150 in series. Resistor 152 in series with diode 154 is connected across resistor 148, with the cathode of diode 154 being connected to the midpoint between resistors 146 and 148. The emitter of transistor 156 is connected to the junction between resistors 148 and 150, and the base of the same transistor is connected to the junction between resistor 152 and the anode of diode 154. A capacitor 158 is disposed between the emitter of transistor 156 and ground. The collector of transistor 158 is returned to ground through resistor 160 and diodes 162 in series, while the junction between resistor 160 and the first diode 162 is coupled to the base of transistor 76 by diode 164. Diodes 162 and 164 have their anode terminals oriented toward the collector of transistor 156. A resistor 166 is disposed between the anode of diode 164 and ground, while another resistor 168 is disposed between the cathode of diode 164 and ground.

As hereinbefore mentioned, a negative-going output pulse from rectangular wave generator 12 is applied at the emitter of transistor 76. In order to register a coincidence, a positive-going output from sampling ramp circuit 20 would simultaneously have to occur at the base of transistor 140. If this should happen, a circuit would be provided through resistor 150, the emitter-base junction of transistor 156, diode 154, resistor 146, and transistor 140 to ground, turning transistor 156 on. The resultant positive-going excursion at its collector is coupled through resistor 160 and diode 164 to the base of transistor 76. With both a positive-going input applied to the base of transistor 76 and a negative-going input applied to the emitter of transistor 76, transistor 76 will turn on, coupling a negative-going signal, indicated at H in FIGS. 1 and 3, to the base of transistor 176 in oscillator gate 24 via resistor 170. If both a positive-going signal from sampling ramp circuit 20 and a negative-going signal from rectangular wave generator 12 are not simultaneously applied to coincidence detector 14, transistor 76 will not turn on. Diodes 162 and 164 provide means for applying a stabilized voltage value to the base of transistor 76 when a positive output from sampling ramp circuit 20 is present Oscillator gate circuit 24 comprises a monostable circuit wherein transistors 174 and 176 are both either on at the same time or off at the same time. Both transistors are normally off. The emitter of transistor 174 is grounded, and its collector is connected to a positive voltage point via resistors 178 and 172 in series. The midpoint between resistors 178 and 172 is also connected to the base of transistor 176. The emitter of transistor 176 is connected to a positive voltage while its collector is direct-coupled to the base of transistor 180 as well as being returned to ground by resistor 182. A resistor 184 returns the base of transistor 174 to ground. A feedback circuit 3½ disposed seconds. the base of transistor 174 and the collector of 176, this circuit comprising the series combination of a capacitor 186 and resistor 188 wherein the series connection is shunted by a capacitor 190. Also, a capacitor 192 is connected across capacitor 186.

When a coincidence is indicated by coincidence detector 14, the negative-going pulse applied at the base of transistor 176 turns transistor 176 on, and the resulting positive-going excursion at the collector of transistor 176 is coupled through the feedback circuit to the base of transistor 174, turning transistor 174 on. The positive-going signal at the collector of transistor 176 is also coupled through emitter-follower connected transistor 180 to oscillator 26. The collector of transistor 180 is connected to a positive voltage-employing resistor 194, and a capacitor 196 is disposed between the collector and ground. The output at the emitter of transistor 180 is indicated at I in FIGS. 1 and 3, and suitably lasts for approximately 3 178 seconds. During this time, capacitors 186, 190, and 192 charge, and eventually the voltage at the base of transistor 174 lowers to a point at which transistor 174 ceases to conduct. The resultant positive-going excursion at the collector of transistor 174 is coupled by means of resistor 178 to the base of transistor 176, cutting the latter off, and concluding the output of oscillator gate 24.

Oscillator 26 comprises a Hartley oscillator circuit wherein a transistor 198 has its collector connected to the emitter of transistor 180 and its emitter connected to the midpoint of the primary winding on a transformer 200. One end of the primary winding on transformer 200 is grounded, while the nongrounded end is coupled through the series connection of resistors 202 and 204 to the collector of transistor 198. The midpoint between the resistors 202 and 204 is connected to the base of transistor 198. Also, a diode 206 is disposed between the emitter of transistor 198 and the junction between resistors 202 and 204. The diode 206, the anode of which is connected to the emitter of transistor 198, is employed to avoid reverse breakdown of the base-emitter junction of transistor 198.

A capacitor 208 is connected across the primary winding of transformer 200, and the circuit constant are such that oscillation takes place at about 500 cycles per second to produce an audio note at speaker 28 for the duration of the output, I, from oscillator gate 24. The collector-emitter current of transistor 198 flows to ground in the lower portion of the primary winding of transformer 200, while the upper portion of the primary winding provides feedback to the base of transistor 198 whereby oscillation is sustained.

The secondary of transformer 200 is coupled to speaker 28 via the parallel combination of resistor 210 and variable resistor 212 as well as through the normally closed contacts of headphone jack 214. Thus, oscillations are normally provided to speaker 28, and variable resistor 212 can be used as a volume control. Alternatively, a headphone plug may be inserted in jack 214 for operating a headphone and disconnecting speaker 28.

A power supply for the apparatus comprises a battery 216, suitably a small eight volt transistor radio battery, the negative terminal of which is grounded. The positive terminal of the battery is connected via main switch 218 and decoupling resistor 220 to the supply terminal 50 for empowering the random noise generator 10 and the rectangular wave generator 12. A decoupling capacitor 222 is connected between ground and the junction between switch 218 and resistor 220, and another decoupling capacitor, 224, is connected between ground and terminal 50. The positive eight volt supply across capacitor 222 is provided for circuit blocks 14, 16, 18, 20, 24, and 26, while the positive 8 volt supply terminal 50 is decoupled from the rest of the circuit. In this manner, noise and the operation of rectangular wave generator 12 are less like to trigger the end of a sampling ramp in sampling ramp circuit 20. In general, rather large values of load resistors are employed in the various individual circuits in order to reduce battery drain. A mercury battery is preferred because of the longer storage life when the instrument is not used.

Figure 4:
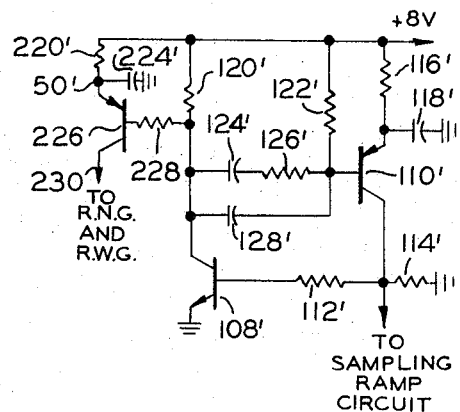
FIG. 4 is a schematic diagram of a portion of the FIG. 2 circuit according to an alternative embodiment of the present invention.

A circuit further reducing battery drain is illustrated in FIG. 4 wherein primed reference numerals are employed to refer to components similarly numbered in FIG. 2. The FIG. 4 circuit is substantially that of sampling ramp gate 18 and operates as hereinbefore described. The circuit may be substituted for the sampling ramp gate in FIG. 2, according to an alternative embodiment of the present invention. The positive 8 volt supply, indicated in FIG. 4, is obtained from the junction of switch 218 and capacitor 222, in common with the 8 volt supply to most of the rest of the FIG. 2 circuitry. However, the supply for random noise generator 10 and rectangular wave generator 12 is now taken at terminal 230 through an additional transistor 226 connected to terminal 50', and via resistor 220' from the 8 volt main supply. Transistor 226 is energized via resistor 228 from the collector of transistor 108', only when the sampling ramp gate provides the waveform E. As a result, the random noise generator and rectangular wave generator will not be energized until waveform D is produced at the end of the timing ramp, consequently reducing battery drain and extending battery life to thousands of hours. When waveform output B is then initiated from rectangular wave generator, the period thereof between negative-going pulses will be random as determined by the noise generator, and the subsequent coincidence with waveform G may or may not occur, as hereinbefore described, on a statistical basis. The general operation of the circuitry of FIGS. 2 and 4 is otherwise substantially the same as described in connection with FIG. 1.

While I have shown and described preferred embodiments of my invention, it will be apparent to those skilled in the art that many changes and modifications may be made without departing from mu invention in its broader aspects.

I claim:

1. Apparatus for producing an output at random, unpredictable intervals wherein the average number of such outputs over an extended period of time can be predetermined, said apparatus comprising:

first means for generating a first repetitive pulse having a period between pulse occurrences on the order of minutes or greater;

second means for generating a second repetitive pulse having a predetermined average period which is much less than the period of said first pulse, said second pulse at each repetition thereof having a predetermined duration as compared with the average period between said second pulses for establishing a controlled chance of time coincidence with a said first pulse;

means for modulating the final time of occurrence of one of said pulses by means of random noise; and means for detecting time coincidence between said first and second pulses for providing said output.

2. The apparatus according to claim 1 wherein the final time of occurrence of said second pulse is determined by said random noise, with the average time of occurrence thereof remaining substantially constant.

3. The apparatus according to claim 1 wherein the duration of each second pulse is between 5 and 15 percent of the period between occurrences thereof to establish a chance of time coincidence of corresponding value and to establish substantially a Poisson distribution of coincidences.

4. The apparatus according to claim 1 wherein said first means for generating said first pulse comprises a first time delay circuit for providing a substantially periodic output having a delay on the order of minutes or greater between occurrences of such substantially periodic output, and a second time delay circuit operated by said first time delay circuit for producing a much shorter delay and providing said first pulse at the end of said shorter delay.

5. Apparatus for producing an output at random, unpredictable intervals comprising:

a first means for providing a first repetitive pulse, said first means comprising a first time delay circuit generating a repetitive output and a second time delay circuit operated by said first time delay circuit and providing an output corresponding to said first pulse at a time after the output of said first time delay circuit shorter than the time between repetitions of the output of the first time delay circuit;

second means for providing a second repetitive pulse having a much faster repetition rate than said first pulse; and means for registering a coincidence between the occurrence of said first pulse and the occurrence of said second pulse to provide an output for said apparatus.

6. The apparatus according to claim 5 wherein said first time delay circuit provides a periodic output having a period on the order of minutes, and said second time delay circuit provides a delay for the production of said first pulse which delay is on the order of milliseconds.

7. The apparatus according to claim 5 wherein said second means further includes a random noise generator for modulating the output time of repetitions of said second pulse.

8. The apparatus according to claim 5 further including an audio oscillator for providing an audible tone in response to a coincidence registered by said means for detecting such coincidence.

9. The apparatus according to claim 5 wherein said first time delay means is connected to empower said second means at the time of an output of the first time delay means.

10. The apparatus according to claim 5 including a common power supply for said first and second means.

11. The apparatus according to claim 5 wherein said first and second time delay circuits each comprise ramp waveform generators including means for detecting when a ramp waveform generated thereby reaches a predetermined value for ascertaining a predetermined time, the ramp produced by the second time delay circuit having a greater slope than the ramp produced by the first time delay circuit.

12. The apparatus according to claim 7 wherein said second means further comprises a rectangular wave generator having a normal predetermined period and receiving the output of said noise generator for modulating such period.

13. The apparatus according to claim 12 wherein said rectangular wave generator is adapted to produce said second pulse with a predetermined duration compared with the period between repetitions thereof for establishing a duty factor for predicting the number of coincidences detected by said means for detecting such coincidences, over an extended period of time.

UNITED STATES PATENT OFFICE
CERTIFICATE OF CORRECTION

Patent No.    3,573,652    Dated   April 6, 1971

Inventor(s)     THOMAS H. CHARTERS

It is certified that error appears in the above-identified patent and that said Letters Patent are hereby corrected as shown below:

Column 3, line 59, "present" should read --preset--.
    Column 4, line 1, "register" should read --at--; line 3 after "and in" insert --a--; lines 4 through 6, "has provid through dimensions 150, the emitter-base junction of transi 156, diode 154, resistor 146, and transistor to ground, tur transistor 156" should read --had case dimensions of--.
    Column 7, line 1, "158" should read --156--; line 30, i a period, --.--, after "present"; line 42, "$3\frac{1}{2}$ disposed sec should read --is disposed between--; line 59, "3 178" shoul read --three and one-half--.
    Column 8, line 8, "constant" should be --constants--; line 37, "like" should be --likely--; line 73, "mu" should --my--.

Signed and sealed this 9th day of November 1971.

(SEAL)
Attest:

EDWARD M. FLETCHER, JR.
Attesting Officer

ROBERT GOTTSCHALK
Acting Commissioner of Pat